Aug. 23, 1960  KEN-ICHIRO KURITA  2,949,845
FILTER PRESS
Filed April 1, 1958  5 Sheets-Sheet 2
Fig. 2
Fig. 4
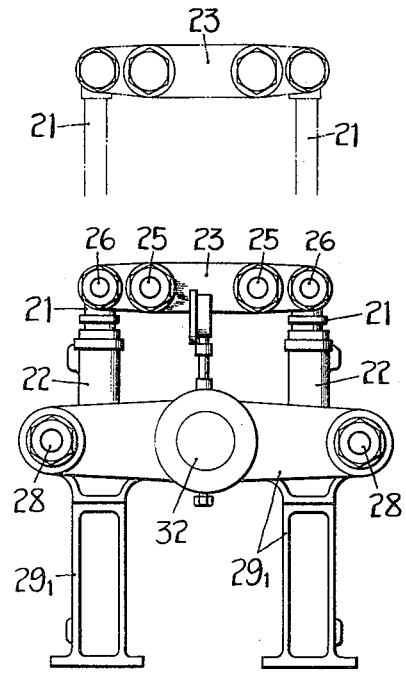
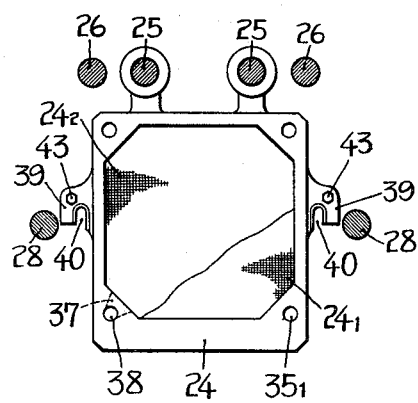
Fig. 3
Fig. 5
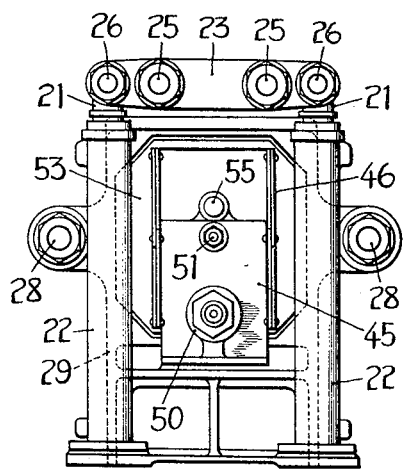
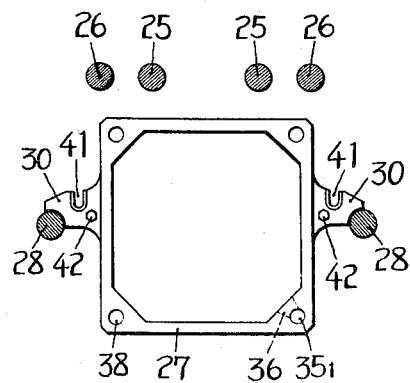
Inventor.
Ken-ichiro Kurita,
by Hall & Houghton
Attorney Aug. 23, 1960  KEN-ICHIRO KURITA  2,949,845
FILTER PRESS
Filed April 1, 1958  5 Sheets-Sheet 3

Inventor,
Ken-ichiro Kurita,
by Hall & Houghton
Attorney.

Aug. 23, 1960 KEN-ICHIRO KURITA 2,949,845
FILTER PRESS
Filed April 1, 1958 5 Sheets-Sheet 5

Inventor.
Ken-ichiro Kurita,
by Hall & Houghton
Attorney.

United States Patent Office 2,949,845
Patented Aug. 23, 1960

2,949,845
FILTER PRESS
Ken-Ichiro Kurita, 22 Kitasakaigawa-cho, Osaka City, Japan
Filed Apr. 1, 1958, Ser. No. 725,611
7 Claims. (Cl. 100—198)

This invention relates to a filter press, more particularly to a filter press having an automatic cleaning device.

In order to be cleared of filter cakes, filter presses heretofore in use need dismounting and hand cleaning at certain intervals. The object of the present invention is to provide means for removing filter cakes automatically when they accumulate to a certain amount in a filter press in operation.

With this object in view, the present invention provides a filter press with an automatic cleaning device, in which when accumulating filter cakes causes the pressure of slurry to exceed a certain limit, the feed of it is stopped by the agency of some proper controller, filter plates are parted and lifted from filter frames so that the filter cakes in the frames may be removed by the traverse movement of a scraper through the frames, and then, with the filter plates put back to the former place and joined to the filter frames, the feed of slurry resumes.

Other and further objects of the present invention will become apparent from the following specification and claims taken together with the accompanying drawings in which is shown the preferred embodiment of the filter press of the present invention.

Figure 1:
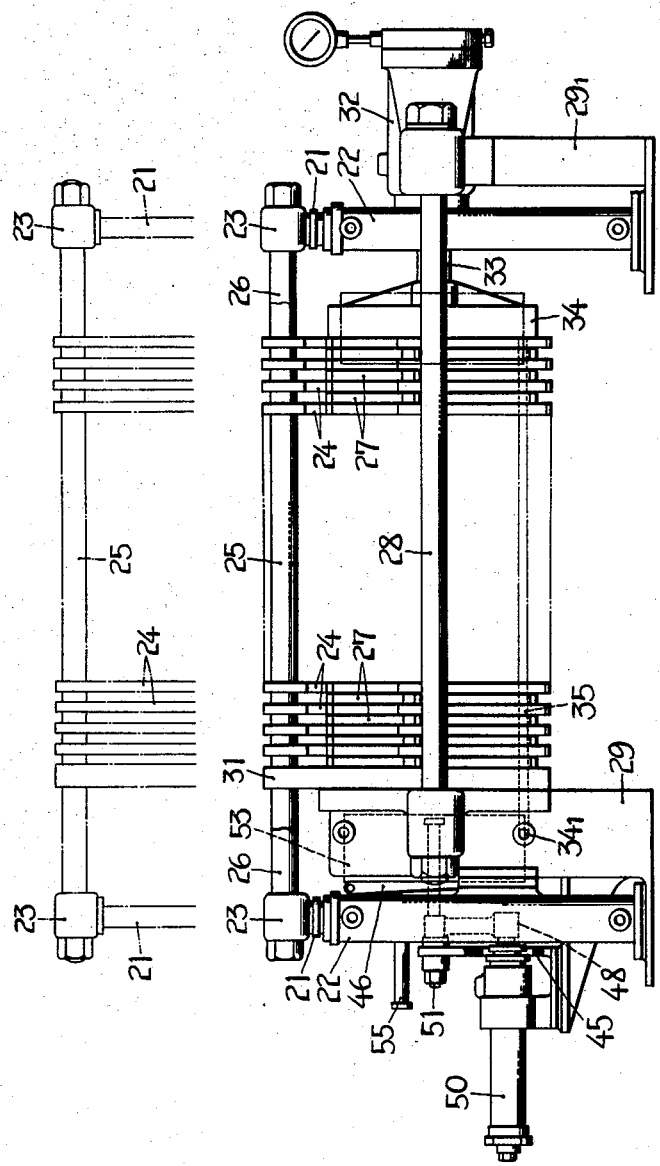
Figure 6:
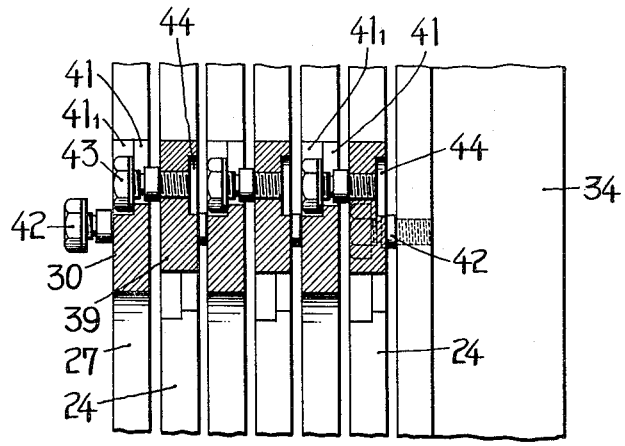
Figure 7:
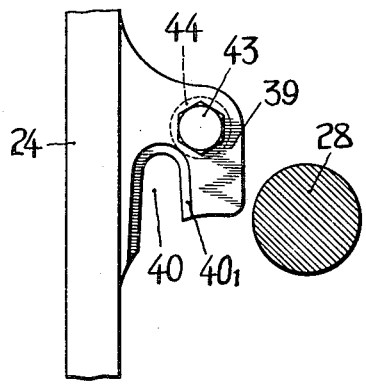
Figure 8:
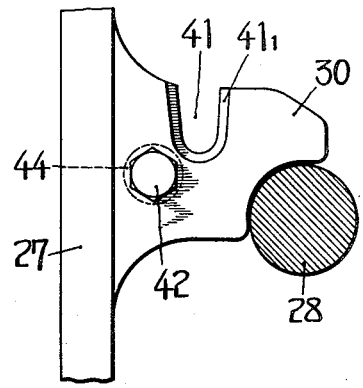
Figure 9:
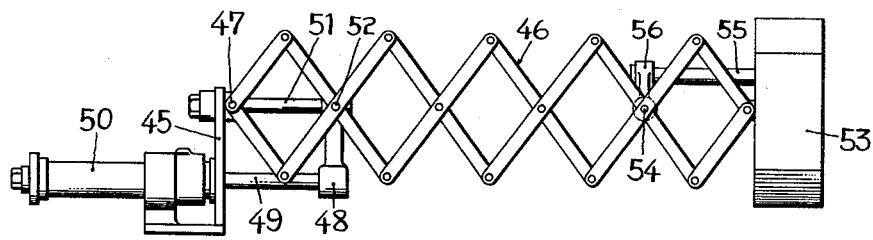
Figure 10:
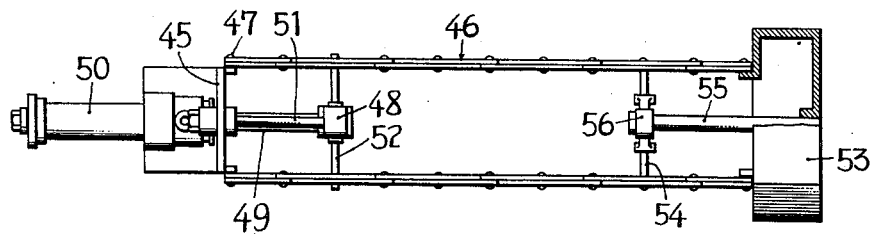
Figure 11:
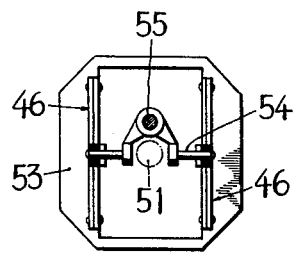
Figure 12:
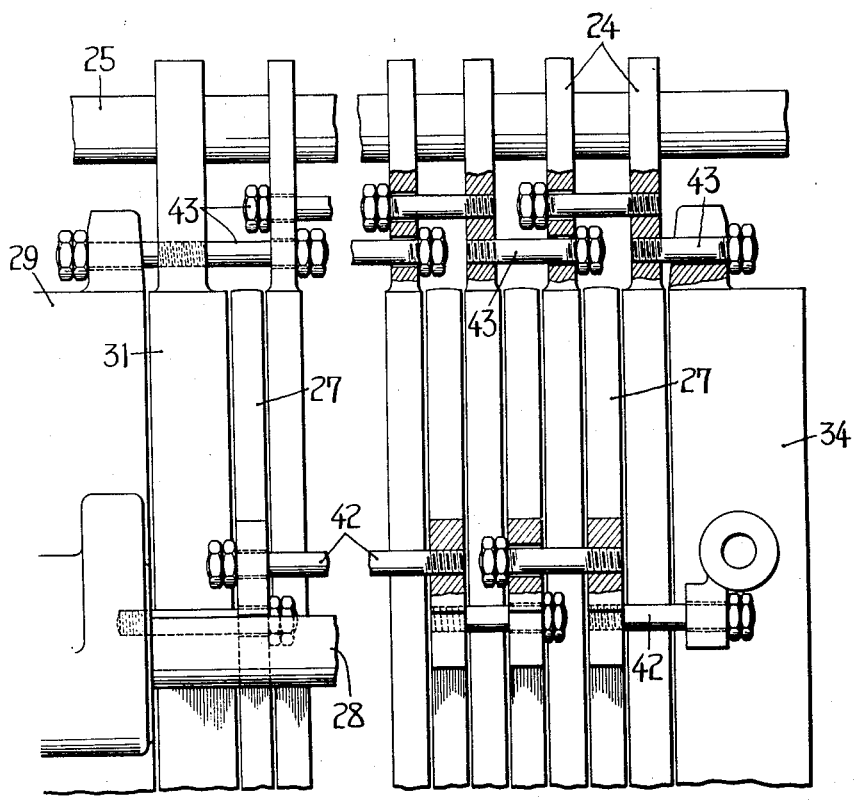

Fig. 1 is an elevation partly in section of a filter press embodying the present invention.
Fig. 2 is a right side view of the same.
Fig. 3 is a left side view of the same.
Fig. 4 is an elevation of a filter plate.
Fig. 5 is an elevation of a filter frame.
Fig. 6 is a sectional side view showing connections of filter plates and filter frames.
Fig. 7 is an enlarged elevation of a part of the filter plate.
Fig. 8 is an enlarged elevation of a part of the filter frame.
Fig. 9 is an elevation showing a scraper and its operating device.
Fig. 10 is a plan view of Fig. 9.
Fig. 11 is a side view of Fig. 9, and
Fig. 12 is a side view partly in section showing connections of filter plates and filter frames of a modification of the present invention.

In these drawings reference numeral 21 indicates a ram of a pressure oil cylinder 22 installed at each of the four corners of a filter press. Each pair of rams 21 is connected by a connecting beam 23 and a number of filter plates 24 are mounted at some proper intervals on the supporting rods 25 fixed horizontally and in parallel to the pair of the connecting beams 23, which are connected with each other by a pair of connecting rods 26. Filter frames 27 inserted between every two adjacent filter plates 24 are supported by their projections 30 on side rods 28 fixed to a top head 29 and a cross head $29_1$. An end plate 31 mounted on the supporting rods 25 is inserted between the top head 29 and the end filter frame 27. In the middle of the cross head $29_1$ is fixed another pressure oil cylinder 32, a ram 33 thereof is provided with a movable head 34 to push forward or pull back the filter plates 24 and the filter frames 27.

Slurry from a feed pipe (not shown) is fed through an inlet hole $34_1$ of the top head 29 into feed way 35 formed by a chain of holes $35_1$ of the end plate 31, of the filter frames 27 and of the filter plates 24. This slurry is then fed into each filter frame 27 through the branch 36 of the feed way 35, and then into each filter plate 24, in which the slurry is filtrated through a filter cloth $24_1$ and a filter screen $24_2$ attached to it by means of screws or pasting. The filtered liquid, then passing through each branch 37 formed in each of the filter plates 24 and a discharge way (not shown) formed by a chain of holes 38 of the end plate 31, of the filter plates 24 and of the filter frames 27, is discharged at a discharge hole (not shown) of the top head 29.

On the projection 39 of the filter plate 24 is formed a downward notch 40 and on that of the filter frame 27 an upward notch 41; the positions of the two notches not answering to each other. On the projection 30 of the filter frame 27 a bolt 42 is screwed in at the place corresponding to the downward notch 40 of the projection 39, on which is screwed in a bolt 43 corresponding to the upward notch 41 of the projection 30. Thus each filter plate 24 is connected with each filter frame 27, the bolts 42, 43 catching in the notches 40, 41.

Along the edges of the notches 40, 41 are formed steps $40_1$, $41_1$ for the screwheads of the bolts 42, 43 to get in and on the projections 30, 39, corresponding to the screwheads of the bolts 42, 43, are made dents 44 for the screwheads to fit in. The end plate 31 and the movable head 34 are connected with the filter frame 27 and the filter plate 24 respectively in the same manner as described above. Thus pushed by the movable head 34, the filter plates 24 and the filter frames 27 are closely joined together, with the screwheads of the bolts 42, 43 fitting into the dents 44, and when pulled back by the movable head 34, the filter plates 24 and the filter frames 27, connected with each other by the bolts 42, 43, are kept at certain intervals.

The filter plates 24 and the filter frames 27 may be connected as shown in Fig. 12, in which the two adjacent filter plates 24 are connected with each other successively by the bolt 43 to permit relative traverse movement, and the two adjacent filter frames 27 are connected with each other successively by the bolt 42 to permit relative traverse movement. The outer filter plates 24 are connected to the top head 29 through the end plate 31, and directly to the movable head 34 respectively so as to be lifted up, and capable of relative traverse movement, and the outer filter frame 27 is connected to the movable head 34 by the bolt 42 to permit relative traverse movement.

To a supporting plate 45 fixed to the top head 29 is linked an end of a lazy tongs 46 with a rivet 47 and the upper end of an arm 48 fixed to the end of a ram 49 of a pressure oil cylinder 50 is slidably mounted on a supporting rod 51 fixed to the plate 45. The second pin 52 of the lazy tongs 46 is inserted into the upper end of the arm 48. Then, according to the traverse movement of the ram 49, the lazy tongs 46 expands or contracts, supported by the supporting rod 51. On the other end of the lazy tongs 46 is fixed a scraper 53 to go and return through the filter frames 27. The second pin 54 of this end of the lazy tongs 46 is inserted into a slider 56 mounted on a supporting rod 55 fixed to the scraper 53 and thus the scraper 53 pushed out is kept from deviating from its course. The top head 29 is of an arch shape, etc. to take in the scraper 53 when it returns.

Each pressure oil cylinder is fed with compressed oil through an oil pump and a control valve, not shown in the drawings. When filter cakes accumulating in the filter frames 27 causes the pressure of the slurry to reach a certain limit, the control valve operates electromagnetically by the agency of some proper controller and compressed oil is fed to each cylinder in some prearranged order at certain intervals. This system of feeding each cylinder with compressed oil by a single oil pump and a single control valve can be applied also to the case of employing several filter presses together. And furthermore, a hydraulic system may be substituted for this oil pressure one.

In a filter press constructed as above, when filter cakes accumulating in the filter frames 27 causes the pressure of the fed slurry to reach a certain pressure, first the feed of slurry is stopped by the controller operating simultaneously. Then the cylinder 32 is fed with compressed oil, the movable head 34 fixed to the ram 33 goes back, and the filter plates 24 and the filter frames 27 are kept at certain intervals. In this, the filter plates 24 slide hanging from the supporting rods 25, the filter frames 27 move along with their projections 30 supported on the side rods 28, and the screwheads of the bolts 42, 43 enter the dents $40_1$, $41_1$.

When the filter plates 24 and the filter frames 27 spread at certain intervals, the cylinders 22 are fed with compressed oil and the supporting rods 25, with the rams 21 raised at once, lift the filter plates 24 and the end plate 31 up to the height shown in the chain line in Fig. 1, the lower parts of the filter plates being sandwiched between the top head 29, the filter frames 27 and the movable head 34.

Then the cylinder 50 operates by the agency of the controller, the ram 49 protrudes and the lazy tongs 46 expands, thrusting the scraper 53 forward. The scraper 53, pushed out through the filter frames 27 with filter cakes in them, discharges the cakes down from between the filter frames 27. Thus the clearing of filter cakes, which has been the most troublesome part of the operation of a filter press, is automatically done. When the filter cakes have been removed, the direction of feeding compressed oil into the cylinder 50 changes, the ram 49 recedes and the lazy tongs 46 contracting, the scraper 53 returns to the former place. Both ends of the lazy tongs 46 are linked to the supporting rods 51, 55, so the scraper 53 makes traverse movement without deviating from its course.

When the scraper 53 returns, the cylinders 22 work, the rams 21 and the supporting rods 25 sink, and the filter plates 24 and the end plate 31 come back to the former position, the bolts 42, 43 catching in the notches 40, 41. Then the movable head 34 fixed on the end of the ram 33 is thrust forward by the agency of the cylinder 32, the fiter plates 24 and the filter frames 27 are closely joined together to be fed with slurry and in this way the operation of the filter press resumes.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having thus described my invention, what I claim and desire to secure by Letters Patent of the United States is:

1. A filter press comprising a frame including a plurality of side rods, a plurality of filter frames laterally supported by said side rods and slidably engaged therewith, each of said filter frames being formed with an opening therethrough, at least one supporting rod mounted on said frame over the filter frames, filter plates mounted on and slidably engaging said supporting rod, means for moving said supporting rod vertically to remove the filter plates from between the filter frames, said filter frames and said filter plates alternately and separably overlapping each other, a scraper, and means for moving said scraper transversely of and through the openings of said filter frames.

2. A filter press comprising a frame including a plurality of side rods, a plurality of filter frames laterally supported on said side rods and slidably engaged therewith, each of said filter frames being formed with an opening therethrough, at least one supporting rod mounted on said frame over the filter frames, filter plates mounted in slidable engagement on said supporting rod, said filter frames and said filter plates alternately and separably overlapping each other, means including a ram for moving said supporting rod vertically to lift said filter plates from between said filter frames, a scraper, and means including a ram for moving said scraper transversely of and through the openings of said filter frames when said filter plates are in a lifted position.

3. A filter press comprising a frame including a plurality of side rods, a plurality of filter frames laterally supported on said side rods for slidable engagement therewith, each of said filter frames being formed with an opening therethrough, at least one supporting rod mounted on said frame over the filter frames, filter plates mounted on said supporting rod for slidable engagement therewith, said filter frames and said filter plates alternately and separably overlapping each other, means including a ram mounted on said frame for spreading said filter frames and said filter plates laterally and for moving them back together, means including a ram mounted on said frame for moving said supporting rod vertically to lift said filter plates from between said filter frames, a scraper mounted on said frame, means for moving said scraper transversely through the openings of said filter frames when said filter plates are in a lifted position, and means coupling said filter frames and said filter plates for limiting their separation.

4. The press of claim 3, said filter plates and filter frames having passages therethrough for slurry to be filtered.

5. The press of claim 3, said scraper moving means comprising a ram and lazy tongs operated thereby.

6. A filter press comprising, in combination, a frame, a set of laterally spaced filter frames mounted on said frame and having openings therethrough, a set of laterally spaced filter plates mounted on said frame in interleaved relation with said filter frames, means mounted on said frame for withdrawing one of said sets from between the other, a scraper, and means mounted on said frame for moving said scraper transversely of and through the openings in said filter frames when said one set is withdrawn from the other.

7. The press of claim 6, further comprising means for spreading said filter frames and filter plates laterally to facilitate the withdrawal of said one set.

References Cited in the file of this patent

UNITED STATES PATENTS

| 1,893,854 | Wilhelm | Jan. 10, 1933 |

FOREIGN PATENTS

| 258,581 | Italy | May 4, 1928 |
| 911,942 | France | July 24, 1946 |